Oct. 26, 1954     G. A. CASTELL     2,692,638
PORTABLE ARMREST FOR MOTOR VEHICLES
Filed Nov. 2, 1951
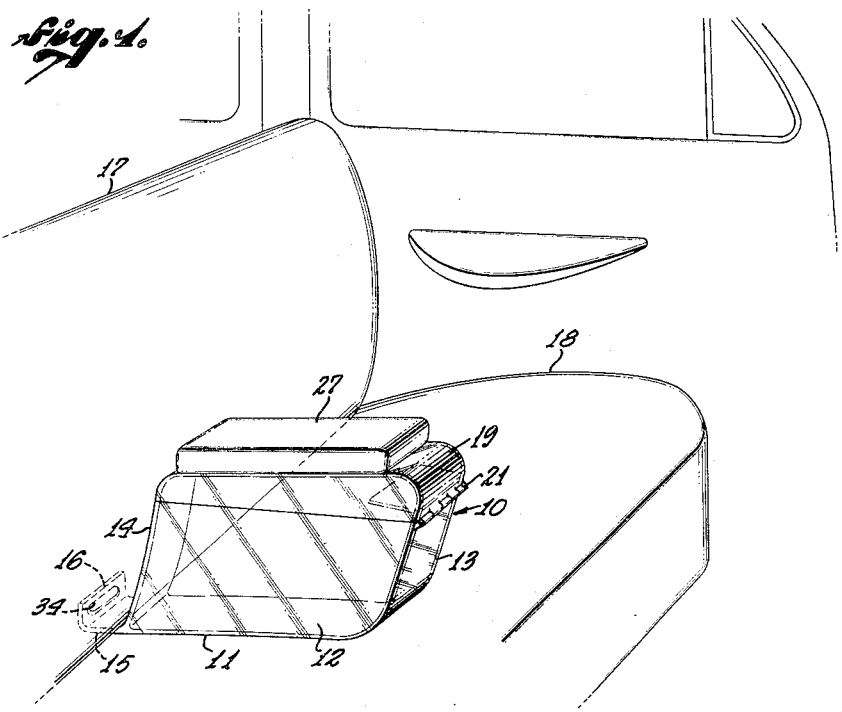
GAIL A. CASTELL,
INVENTOR.
BY George V. Smyth
ATTORNEY.

Patented Oct. 26, 1954

2,692,638

UNITED STATES PATENT OFFICE 2,692,638

PORTABLE ARMREST FOR MOTOR VEHICLES

Gail A. Castell, Tucson, Ariz.

Application November 2, 1951, Serial No. 254,477

1 Claim. (Cl. 155—112)

The present invention relates to improvements in arm rests for automobile seats or the like and is particularly directed to a removable arm rest which forms a container or receptacle.

The arm rest of the present invention is particularly adapted for use in a selected position intermediate the ends of a seat of an automobile as a support for the inner arm of either or both occupants of the seat. The arm rest is removable so that it may be stored out of the way when an arm rest is not desired. Such arm rests have been heretofore proposed, but have not been adopted by motorists for several reasons.

These prior arm rests, in most instances, were not capable of being securely mounted in position on the seat and were consequently not adequate to form a steady rest for the arm of the user. Another objection raised by most motorists was that the outer covering of the arm rests failed to harmonize with the upholstery or seat covering and detracted from the appearance of the interior of the automobile. If a custom upholstery was applied as an outer covering matching the upholstery of the seat, the cost of the arm rest was prohibitive.

The arm rest of the present invention obviates these objections for it can be securely mounted in any desired position transversely of the automobile seat. The mounting means includes a tongue longitudinally projecting from the rear wall adjacent the lower edge thereof and terminating in an upturned flange engageable with the rear surface of the back rest after the tongue is inserted between the lower edge of the back rest and the seat bottom. The flange and tongue coact to form a hook-like formation for securely anchoring the arm rest against longitudinal movement while permitting transverse movement without removal of the arm rest from the seat.

Furthermore, the arm rest of the present invention, as it is formed of a unitary or one piece body member of transparent material, will not detract from the appearance of the interior of the automobile. This is so for the seat covering or upholstery is visible at all times and to a casual observer the arm rest appears to be provided with an outer covering identical with the upholstery or covering of the seat.

The body member of the arm rest comprises an elongate box-like member which forms a compartment open at the top thereof. A closure element, hingedly mounted to the upper portion of the body member, forms an arm support as well as a closure for the container provided by the body member. Thus, in addition to its function as an arm rest, the device of the present invention also affords additional storage area within the automobile for holding maps and other like articles.

Other features and advantages of the present invention will be hereinafter apparent from the following description, particularly when taken in connection with the accompanying drawing, in which:

Figure 1 is a perspective view of a portion of the interior of an automobile showing the arm rest of the present invention in position on the seat;

Figure 2 is a vertical section of the device of the present invention;

Figure 3 is a section taken along line 3—3 of Figure 2; and

Figure 4 is a view similar to Figure 3 but showing a modified form of the device.

The arm rest of the present invention, referring now to the drawing and more particularly to Figure 1, comprises a box-shaped body member 10 open at the top thereof and including a bottom wall 11, opposite side walls 12, and a front wall 13 and a rear wall 14 interconnecting the side walls 12. In the now preferred embodiment of the present invention the member 10 is integrally cast or molded of a transparent rigid material, such one of the plastics. Although it is now preferred to use a clear, transparent material, obviously a colored transparent material could be used if desired. As the arm rest is to be mounted to a seat member and positioned transversely of the same in an upright position as shown in Figure 1, the same, if formed of a clear material, does not detract from the appearance of the automobile as the upholstery or seat covering is visible through the arm rest.

During the molding operation forming the body member 10, a tongue 15 is simultaneously formed and this tongue longitudinally projects rearwardly substantially as a continuation of the bottom wall 11. The tongue 15, as clearly shown in Figure 1, is of a width substantially equal to the width of the body member and terminates in an upturned flange 16. To mount the body member transversely of the automobile seat the tongue 15 is inserted between the adjacent surfaces of the back rest 17 of the seat and the seat bottom 18. This is done by somewhat compressing the back rest 18 to forcibly insert, first the upturned flange, and then the tongue into the position as clearly shown in Figure 2. In the inserted position the flange 16 engages the rear surface of the back rest 17 and securely holds the body member against longitudinal movement. As the material of which the body member is formed is somewhat resilient, the material of the back rest will be somewhat compressed between the flange 16 and the rear wall 14 of the body member 10. The rear wall, as best seen in Figure 2, as well as the bottom wall 11 is curved to conform to the contour of the back rest and seat bottom respectively of the seat.

In the embodiment of the invention shown in Figures 1 through 3, a closure means 19 is hingedly mounted to the upper edge of the front wall 13. This closure means also comprises an elongated box-like member which like the body member 10 is integrally formed by a molding operation. The material of the closure means is preferably the same as that used to form the body member 10. The hinge connection 21 between the closure means 13 and the body member 10 may comprise a hinge of which the hinge barrels are formed integral with the closure means and the wall 13 during the molding process.

The closure means, it will be seen, is mounted in an inverted position to close the open upper end of the body member 10, that is, the box-like member forming the closure is open at the bottom. The wall means forming the closure 19 are somewhat thicker than the walls of the body member 10 and the edge faces of the walls of the closure means 19 are cut away to form downwardly faced shoulders against which the upwardly directed edge faces of the walls of the body member seat when the closure means is moved to its closing position as shown in Figure 2.

The rear wall 14 of the body member 10 is preferably formed at the upper edge thereof with a laterally extending groove 22 which receives an elongate rib 23 formed on the one face of the rear wall 24 of the closure means 19. The groove 22 and the rib 23 serve as a latch means for releasably holding the closure means 19 in its closing position, as shown in Figure 2.

The upper wall 25 of the closure means 16 carries a suitable pad-like member 27 which is preferably filled with some resilient material, such as foam rubber or other like material, to form a cushion for supporting the arm of a person using the arm rest of the present invention. The member 27 may be secured to the wall 25 by any means desired and the outer covering thereof preferably would be of a neutral color.

If desired a small plate 29 can be secured to the one wall of the closure means 19 adjacent the hinge 21 to form a small shelf element within the closure means. As the shelf formed by the plate 29 is fixed to the wall carrying the hinge element of the closure means, any articles supported by the shelf 29 will remain in place even if the closure means is swung open to permit access to the retainer or compartment formed by the body member 10. It will be seen that any article supported by the shelf formed by the plate 29 would merely slide downwardly on the plate as the closure means was swung to its open position and would not be projected into the main compartment of the body member 10.

In the embodiment of the invention shown in Figure 4, the closure means 31 is hingedly connected not to the front wall 13 of the body member 10, but to one of the side walls 12. The hinge connection 32 may be identical with the hinge connection 21 although, if desired, separate hinge elements could be used. This is also true of the hinge connection 21 of the earlier described embodiment of the invention. The closure means 31 of the embodiment now being described carries a pad-like member 33 identical in all respects to the element 27 of the earlier described embodiment and is releasably held in its closing position by a latch formation such as the latch formation 22, 23 earlier described.

It should now be seen that in all embodiments of the invention illustrated, an arm rest is provided for use in combination with the seat of an automobile comprising a box-shaped body member of transparent material open at the upper end and pivotally carrying a closure means for closing the open upper end. The arm rest can be positioned in any preselected position transversely of a seat to provide an arm rest as well as a storage compartment. As the body member is preferably formed of a transparent material, it will not clash with the interior of the automobile as the upholstery or seat covering is visible through the arm rest. The arm rest is furthermore very securely mounted in position transversely of the seat because of the particular mounting means formed by the tongue 15 and the upturned flange 16.

The upturned flange 16 in all embodiments of the invention is formed with an opening 34 which forms a hand hold to permit the arm rest to be easily carried whenever necessary. It will be seen that the opening 34 constitutes the flange 16, a handle, as well as a securing element for mounting the arm rest to a seat.

Although the now preferred embodiments of the present invention have been shown and described herein, it is to be understood that the invention is not to be limited thereto, for it is susceptible to changes in form and detail within the scope of the appended claim.

I claim:

A portable arm rest for use in combination with the seat of an automobile comprising: a box-shaped body member open at the top thereof, including a bottom, opposite side walls, a front and a rear wall interconnecting said side walls, all of said walls being integrally formed of a transparent rigid material; a box-shaped closure member; means for hingedly mounting the front wall of said closure member in an inverted position to the front wall of said body member; a plate so angularly carried by the front wall of said closure member as to form a shelf element inclined upwardly from the front wall of said closure member; and a tongue longitudinally projecting from the rear wall of said body member adjacent the lower end thereof and terminating in an upturned flange having an opening therein, said flange forming a handle for carrying the arm rest, said flange engageable with the rear surface of the back rest of a seat to secure the arm rest in position transversely of the seat after the tongue is inserted between the adjacent surfaces of the back rest and seat bottom of said seat.

References Cited in the file of this patent

UNITED STATES PATENTS

| Number | Name | Date |
|---|---|---|
| 2,006,883 | Davies | July 2, 1935 |
| 2,524,659 | Gorman | Oct. 3, 1950 |
| 2,524,909 | Hines | Oct. 10, 1950 |
| 2,587,302 | Fawcett | Feb. 26, 1952 |

FOREIGN PATENTS

| Number | Country | Date |
|---|---|---|
| 853,846 | France | Dec. 16, 1939 |